Aug. 12, 1952 A. AXELROD ET AL 2,606,956
AUTOMATIC CALIBRATION OF INSTRUMENTS
Filed Sept. 2, 1950 3 Sheets-Sheet 1

INVENTORS
ALBERT AXELROD
SAM K. LACKOFF
BY THOMAS J. McLAUGHLIN

ATTORNEY.

Aug. 12, 1952

A. AXELROD ET AL 2,606,956

AUTOMATIC CALIBRATION OF INSTRUMENTS

Filed Sept. 2, 1950

3 Sheets-Sheet 3

*Fig. 3*

INVENTOR.
ALBERT AXELROD
SAM K. LACKOFF
BY THOMAS J. McLAUGHLIN

Theodore Helms
ATTORNEY.

Patented Aug. 12, 1952

2,606,956

UNITED STATES PATENT OFFICE 2,606,956

AUTOMATIC CALIBRATION OF INSTRUMENTS

Albert Axelrod, Bronx, N. Y., and Sam K. Lackoff, East Paterson, and Thomas J. McLaughlin, New Milford, N. J., assignors to Loral Electronics Corporation, a corporation of New York Application September 2, 1950, Serial No. 183,075

17 Claims. (Cl. 175—183)

This invention relates to measuring instruments and more specifically to the calibration of instruments with a high degree of accuracy and with a minimum of manual operations.

One of the objects of the invention is to calibrate an instrument by comparing predetermined values of the instrument's scale with the corresponding values of a standard instrument, and depending upon a predetermined relation of these values to cause a scale indication to be registered and simultaneously the comparison of the next values to be effected, and so forth until the entire scale of the specimen instrument is correlated to the scale of the standard instrument.

Another object of the invention is to couple the instrument to be compared with a standard instrument and to vary the instrument to be compared over its scale while comparing the values of the standard instrument with the values of the instrument to be compared, there being provided comparison means controlled by the two values, which, at a predetermined relation of these values, will register the position of the specimen instrument and initiate a comparison operation of the next value of the two scales.

A more specific object of the invention is to provide in a calibration system a source of standard signals, an instrument including a source of other signals to be compared with said standard signals, means for varying said other signals, comparison means under control of said two sources, counting means under control of said varying means, and means under control of said counting means for registering a predetermined relation between said signals.

Figure 1:
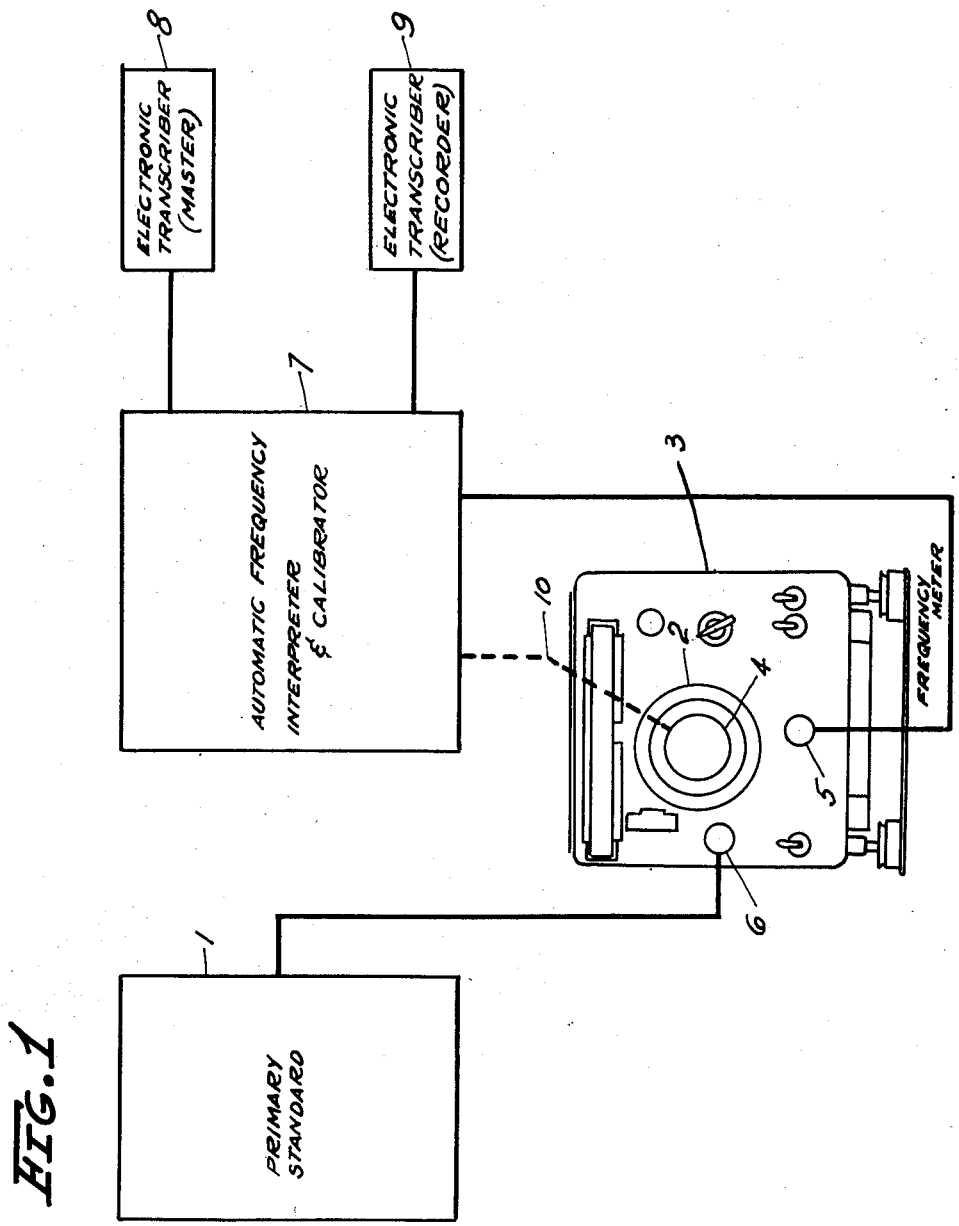

These and other objects of the invention will be more apparent from the drawings annexed hereto, in which Figure 1 shows in block diagram the general arrangement of an automatic calibrator for testing a series of frequency meters.

Figure 2:
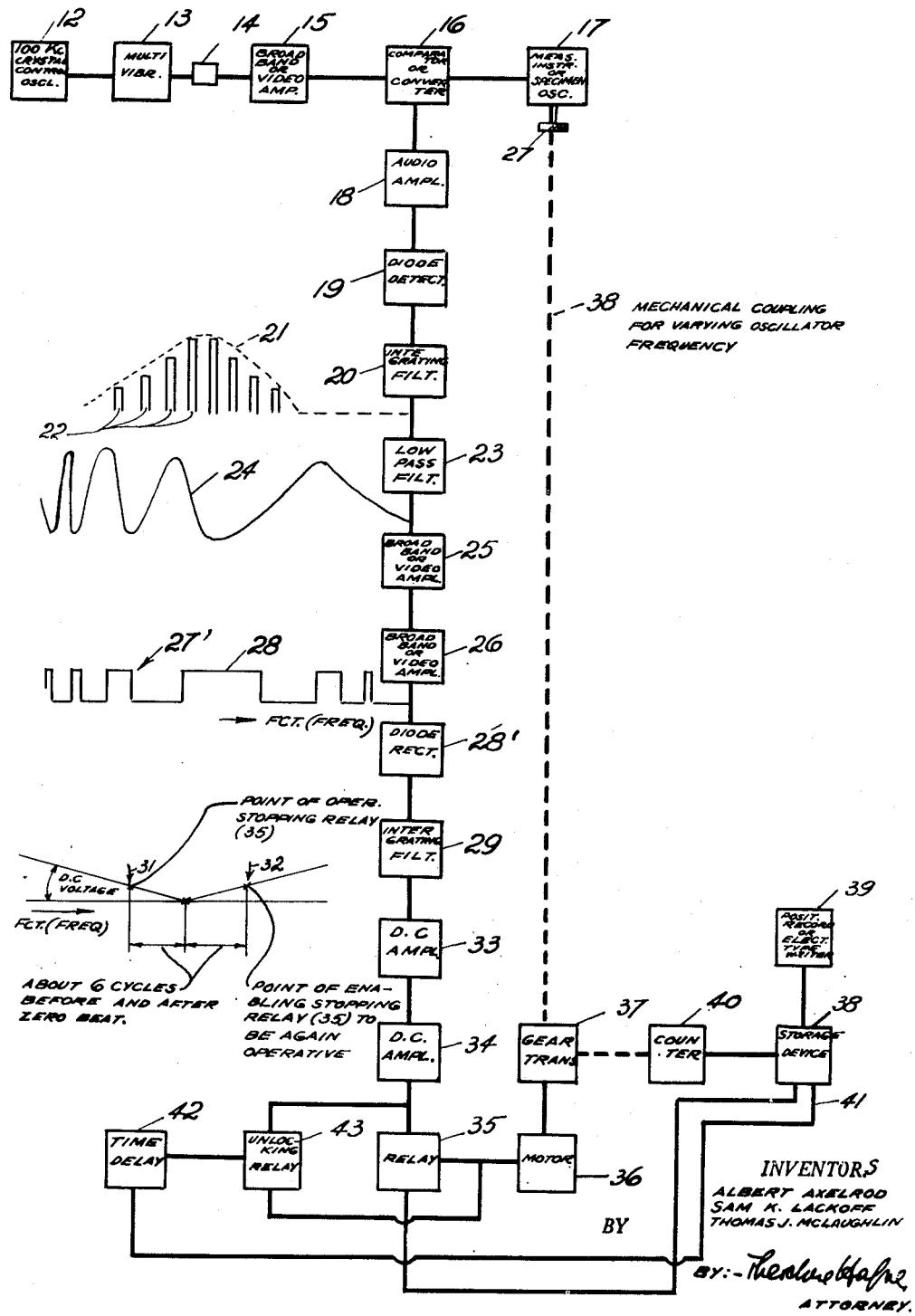

Figure 2, also in block diagram, explains the calibration procedure in greater detail.

Figure 3 shows the low frequency portion of the circuit illustrated in Figures 1 and 2 in greater detail.

In Figure 1, 1 represents a primary standard frequency source, for example a crystal-controlled multi-vibrator or frequency divider having an accuracy of less than two parts in ten million, controlling the frequency shown on scale 2 of frequency meter 3.

4 is a dial controlling the usual oscillator in frequency meter 3, and 5 is an audio frequency outlet connectable to a telephone which permits the user of frequency meter 3 to decide the amount of beat between the frequency source applied to terminal 6—which in the field is usually the source the frequency of which is to be determined—and the internal oscillator (not shown) controlled by knob 4. At zero beat, observed at terminal 5, the frequency beating with the internal oscillator of frequency meter 3 may be observed by proper adjustment of knob 4 on scale 2.

For automatic calibration in accordance with the invention, knob 4 is mechanically or electromechanically coupled over a shaft or the like to calibrator 7, the output of which is applied to one or more electronic transcribers, one being a master indicator, the other being a recorder, as schematically indicated at 8 and 9, respectively.

In the calibration system, the output of terminal 5, after having been appropriately beaten with the output of primary standard 1, is applied to calibrator 7. At predetermined relative values, for example zero beat or near zero beat of primary standard and internal frequencies, calibrator 7 stops, through mechanical link 10, the movement of control knob 4 and at the same time takes count of the movement or rotation described by knob 10 until the position of zero or near zero beat is achieved. This count is registered on electronic transcriber 8 and also if necessary recorded on recorder 9.

Immediately after having achieved the recording operation under control of the counting and recording mechanism, calibrator 7 causes further movement of knob 4 through mechanical link 10 and upon a predetermined relation of standard and internal frequencies communicated over line 11 to calibrator 7; again a stoppage occurs of knob 4 and counting, registration, and recording are effected as before.

These operations continue until the entire scale 2 of frequency meter 3 is related to a corresponding number of values counted, registered, and recorded, and representing the actual scale values corresponding to the frequencies of primary standard 1.

Figure 2 shows a calibration of a frequency meter at 100 cycle distances within one or more predetermined ranges. Naturally, the invention may be applied with equal effect to 1000 or 10 cycle distances and to any number and size of predetermined ranges without exceeding the scope of the invention.

Figure 2 shows the primary standard source in the form of a 100 kilocycle crystal control oscillator 12 of well known construction controlling, also in well known manner, a multivibrator 13, the frequency mixture of which—containing a great number of multiples of 100 cycles—is applied over filter 14, eliminating the 100 cycles fundamental, to a broad band or video amplifier 15, the output of which goes into a comparison tube 16, which usually is of the conventional form of a pentagrid converter, preferably to the third grid of a pentagrid tube. The control grid of such a tube is controlled from the measuring instrument schematically indicated at 17, which in the present case is the oscillator of a frequency meter.

The output or beat of converter 16 is applied to an audio amplifier 18, which usually is of the cathode follower type.

In Figure 1, circuits 16, 17, and 18 are contained in frequency meter 3. The output of amplifier 18 is applied over a diode detector 19 to integrating filter 20, the output of which is indicated as an envelope 21 of integrated pulses 22. The output of integrating filter 20 is applied to a low pass filter 23, the output wave form of which is indicated at 24, representing the beat frequency.

After renewed amplification in broad band amplifiers 25 and 26, there results a wave form schematically indicated at 27', portion 28 representing zero beat. The output of amplifier 26 is now used to control the movement of knob 27 of specimen oscillator 17.

For this purpose the output of amplifier 26 is passed through diode rectifier 28' and integrating filter 29 to obtain a D. C. voltage variation of the form shown at 30, with pre-zero beat and post-zero beat operation points indicated at 31 and 32 and located at predetermined distance of say 6 cycles before and after zero beat absolute, respectively.

Voltage variation 30 is applied over D. C. amplifiers 33 and 34, respectively, to a relay, preferably of the usual electro-mechanical type, which at a predetermined value, corresponding to point 31—i. e., about 6 cycles before zero beat—operates to deenergize and stop motor 36. Motor 36 normally, over gear transmission 37 and mechanical shaft coupling schematically indicated at 38, rotates the shaft of knob 27, thus varying frequency of specimen oscillator 17. Stoppage of motor 36 stops movement of knob 27. Relay 35, at the same time, operates storage device 38, which may be in the form of electromechanical relays of the telephone type or electronic relays, all of otherwise well known construction, to transmit the information contained on this storage device to a position recorder in the form of electric typewriter 39. Storage device 38, in turn, is controlled by a counting device 40 in the form of contacts operated by gear mechanism 37 to count the movement effected by knob 27 and shaft 38 under control of motor 36 until zero beat or a predetermined position before zero beat is reached.

As apparent from Figure 2, relay 35 is operated at a predetermined position before zero beat and acts to de-energize motor 36 prior to zero beat in order to compensate for the inherent inertia of motor 6 and gear mechanism 37, link 38, etc. Thus it is assured that stoppage of knob 27 on scale 2 (Figure 1) will be effected exactly at zero beat under control of pentagrid converter 16.

After storage device 38 has communicated its information to recorder 39, for instance after the transfer of the last digit and under control of this transfer operation in otherwise well known manner, as indicated by control line 41, a relay of predetermined time delay of well known construction, such as schematically indicated at 42, is set in operation to operate unlocking relay 43, which by-passes relay 34 and permits motor 36 to resume its operation and vary oscillator 17 over gear mechanism 37, link 38, knob 27, and to register another position on scale 2 (Figure 1).

Time delay 42 and unlocking relay 43 serve the following purpose:

Time delay 42 is so adjusted that it operates a predetermined time, say 6 cycles, after the digit stored has been transferred; after the position of zero beat has been passed—i. e., when the position indicated in the voltage curve 30 at point 32 has been reached. Until this position 32 has been reached, time delay 42 will operate and retain operated unlocking relay 43 to short circuit relay 35 so as to operate motor 36.

If relay 35 were not short circuited during the position of the comparison circuits at or near zero beat, relay 35 would again immediately operate to de-energize motor 36 under control of the output of pentagrid converter 16 and it would be impossible to perform the next calibration operation. In other words, relay 35 would only oscillate about its operative position and keep motor 36 constantly de-energized, preventing it from moving knob 27 to the next zero beat position.

Unlocking relay 43 therefore, under control of time delay device 42, serves, during a predetermined critical period around zero beat, to short circuit and by-pass relay 35 and to permit motor 36 again to operate knob 27 over linkage 37, 38, thus causing further variation of the frequency of oscillator 17 and producing a beat which keeps relay 35 in operation energizing motor 36 until the next 100 cycle beat position is reached—i. e., the next position, registration, and recording is effected in a manner similar to that effected before.

These operations go on until the entire scale of the specimen oscillator is passed over.

Figure 3 shows the low frequency circuit of the device in greater detail. The audio output terminal of the frequency meter is indicated at 44 and applied at one side over a diode detector 45 of the 6AL5 type and a low pass filter 46 to an amplifier 47 of the 6AK5 type, and at the other side over another 6AK5 as indicated at 48 to diode rectifier 49 of the 6AL5 type and integrating circuit 50 to D. C. amplifiers 51 and 52 of the 6AT6 and 6SN7 type, respectively, to relay coil 53, which operates contacts 54, 55, connected to the terminals 56 of a decade counter-assembly.

There are two power supplies, one indicated at 57 controlling the D. C. section of the circuit and the other indicated at 58 controlling the A. C. section of the circuit and also controlling the monitor loudspeaker 59, which is controlled over two amplifiers of the 6J6 type indicated at 60 and 61 over a potentiometer from terminal 44.

The invention is, of course, not limited to the circuit connections, circuit elements, and elemental values indicated in Figure 3, but may be used with any other appropriate connections, elements, and values without exceeding its scope. Nor is the invention limited to the measuring or the comparison of frequencies, but may be applied to the evaluation of any other voltage, current or signal sources which may be compared automatically in accordance with the invention without exceeding its scope.

We claim:

1. In a calibration system, a source of standard signals, an instrument including a source of other signals to be compared with said standard signals, means for varying said other signals, comparison means under control of said two sources, counting means under control of said varying means, means for stopping said varying means under control of said comparison means upon a predetermined relation of said signals to permit registration, and means for disabling said stopping means under control of said counting means for a predetermined time thereafter.

2. System according to claim 1, comprising means under control of said counting means for registering a predetermined position of said varying means upon existence of a predetermined relation between said signals, and wherein said varying means is stopped by said comparing means at a predetermined relation of said two signals to permit registration and continues to operate a predetermined time after registration.

3. System according to claim 1, comprising means under control of said counting means for registering a predetermined position of said varying means upon existence of a predetermined relation between said signals, means for stopping said varying means under control of said comparison means upon a predetermined relation of said signals to permit registration, and means for disabling said stopping means under control of said counting means to permit continuation of operation of said signal varying means a predetermined time after registration.

4. System according to claim 1, comprising means under control of said counting means for registering a predetermined position of said varying means upon existence of a predetermined relation between said signals, means for stopping said varying means under control of said comparison means upon a predetermined relation of said signals to permit registration, means for disabling said stopping means under control of said counting means to permit continuation of operation of said signal varying means a predetermined time after registration, and means for disabling said disabling means a predetermined time after registration to permit operativeness of said stopping means after said predetermined time.

5. System according to claim 1, wherein said source of standard signals includes a multivibrator of relatively low frequency and a crystal controlled oscillator of relatively high frequency controlling said multivibrator to obtain a great number of multiples of said lower frequency.

6. System according to claim 1, wherein said source of standard signals includes a multivibrator of relatively low frequency and a crystal controlled oscillator of relatively high frequency controlling said multivibrator to obtain a great number of multiples of said lower frequency, there being provided means for filtering said lower frequency and broad band amplifying means for amplifying said multiples.

7. System according to claim 1, wherein said source of standard signals includes a multivibrator of relatively low frequency and a crystal controlled oscillator of relatively high frequency controlling said multivibrator to obtain a great number of multiples of said lower frequency, and wherein the comparison means include means for beating the frequencies of said two signal sources.

8. System according to claim 1, wherein said source of standard signals includes a multivibrator of relatively low frequency and a crystal controlled oscillator of relatively high frequency controlling said multivibrator to obtain a great number of multiples of said lower frequency, and wherein the comparison means include means for beating the frequencies of said two signal sources, there being provided means for varying the frequency of said other signals and means under control of said beating means for stopping said varying means upon a predetermined number of oscillations prior to zero beat to compensate for inertia of said stopping means.

9. System according to claim 1, wherein said source of standard signals includes a multivibrator of relatively low frequency and a crystal controlled oscillator of relatively high frequency controlling said multivibrator to obtain a great number of multiples of said lower frequency, and wherein the comparison means include means for beating the frequencies of said two signal sources, there being provided means for varying the frequency of said other signals, means under control of said beating means for stopping said varying means upon a predetermined number of oscillations prior to zero beat to compensate for inertia of said stopping means, and means for causing registration and control of said stopping means.

10. System according to claim 1, wherein said source of standard signals includes a multivibrator of relatively low frequnecy and a crystal controlled oscillator of relatively high frequency controlling said multivibrator to obtain a great number of multiples of said lower frequency, and wherein the comparison means include means for beating the frequencies of said two signal sources, there being provided means for varying the frequency of said other signals, means under control of said beating means for stopping said varying means upon a predetermined number of oscillations prior to zero beat to compensate for inertia of said stopping means, means for causing registration and control of said stopping means, and means for disabling said stopping means for a predetermined time after registration to permit re-operation of said varying means.

11. System according to claim 1, wherein said source of standard signals includes a multivibrator of relatively low frequency and a crystal controlled oscillator of relatively high frequency controlling said multivibrator to obtain a great number of multiples of said lower frequency, and wherein the comparison means include means for beating the frequencies of said two signal sources, there being provided means for varying the frequency of said other signals, means under control of said beating means for stopping said varying means upon a predetermined number of oscillations prior to zero beat to compensate for inertia of said stopping means, means for causing registration and control of said stopping means, means for disabling said stopping means for a predetermined time after registration to permit re-operation of said varying means, and means for disabling said disabling means after said predetermined time after registration to permit re-operation of said stopping means.

12. In a calibration system, a source of standard signals, an instrument including a source of other signals, means for varying said other signals, comparison means under control of said two signals, and controlling said varying means to stop operation at a predetermined relation of said two signals and means for delaying stoppage for a predetermined time to permit continuation of variation.

13. System according to claim 12, comprising means for counting the amount of variation, means for stopping said varying means at a predetermined relation of said two signals to permit counting, and means for disabling said stopping means for a predetermined time after stoppage to permit continuation of variation.

14. System according to claim 12, comprising means for counting the amount of variation, means for stopping said varying means under control of said comparison means at a predetermined relation of said two signals to permit counting, means for disabling said stopping means for a predetermined time after stoppage to permit continuation of variation, and means for disabling said disabling means a predetermined time after registration to permit said stopping means again to be operative under control of said comparison means.

15. System according to claim 12, comprising means for counting the amount of variation, means for stopping said varying means at a predetermined relation of said two signals to permit counting, and at least one integrating circuit in the circuit between comparison means and stopping means.

16. System according to claim 12, comprising means for counting the amount of variation, and means for stopping said varying means at a predetermined relation of said two signals to permit counting, there being provided in the circuit between said comparison means and said stopping means the following elements in the order mentioned: first detector means and low pass amplifying means, and second detector means and D. C. amplifying means.

17. System according to claim 12, comprising means for counting the amount of variation, and means for stopping said varying means at a predetermined relation of said two signals to permit counting, there being provided in the circuit between said comparison means, and said stopping means the following elements in the order mentioned: first detector means, low pass filter means, amplifying means, integrating means, second detector means, and D. C. amplifying means.

ALBERT AXELROD.
SAM K. LACKOFF.
THOMAS J. McLAUGHLIN.

REFERENCES CITED

The following references are of record in the file of this patent:

UNITED STATES PATENTS

| Number | Name | Date |
|---|---|---|
| 2,122,622 | Robinson | July 5, 1938 |
| 2,380,947 | Crosby | Aug. 7, 1945 |
| 2,508,547 | Slonczewski | May 23, 1950 |